Patented Dec. 22, 1953

2,663,702

UNITED STATES PATENT OFFICE 2,663,702

PROCESS FOR QUATERNARIZING POLYMERS OF N,N di-METHYL-p-AMINOSTYRENE

Edward L. Kropa, Old Greenwich, Conn., assignor to American Cyanamid Company, New York, N. Y., a corporation of Maine No Drawing. Application July 2, 1949, Serial No. 102,951

5 Claims. (Cl. 260—88.1)

This invention relates to anion exchange materials, methods of manufacturing anion exchange materials, and the use of anion exchange materials for the removal of anions from, or the exchange of anions in, liquid media. More particularly, the invention relates to new granular, water-insoluble anion exchange synthetic resins active for the removal of anions from solution.

It is an object of the present invention to provide new synthetic anion exchange resins active for the removal of anions from solution.

It is another object of the present invention to provide processes for the preparation of new anion exchange synthetic resins active for the removal of anions from solution.

A further object of the present invention is the purification of liquids by means of new granular, water-insoluble anion exchange synthetic resins active for the removal of anions from solution.

The above and other objects are attained by the preparation of a copolymer of a poly-N-substituted aminostyrene containing no amino hydrogen atoms and a polymerizable, polyethylenically unsaturated organic material followed by quaternarization or alkylation of the copolymer, and the application of said quaternarized copolymer in granular or beaded form to the purification of liquids, and more particularly, of aqueous solutions.

The invention will be described in greater detail in conjunction with the following specific examples in which the proportions are given in parts by weight. The examples are merely illustrative, and it is not intended that the scope of the invention be restricted to the details herein set forth.

EXAMPLE 1

*Part A.—Preparation of copolymer*

73.5 parts (0.5 mol) of p-dimethylaminostyrene
32.5 (0.1 mol) of 40% divinylbenzene
1.72 parts of α,α'-azoisobutyronitrile The above ingredients are charged into a suitable vessel, an atmosphere of nitrogen is established, and the vessel is tightly sealed so as to be air-tight. The mixture is heated for 48 hours at 80° C. and then, with the vessel open to the atmosphere, for 120 hours at 120° C. The resin so produced is hard and brittle; it has a density of 35.2 pounds per cubic foot of resin and no capacity for anion exchange.

*Part B.—Quaternarization of copolymer*

I 12.8 parts of 20–60 mesh resin prepared as described in Part A
67.6 parts of dimethyl sulfate The above ingredients are heated for 4 hours at 105–115° C. The resulting resin has a density of 11.7 pounds per cubic foot and an anion exchange capacity of 7.4 kilograins as calcium carbonate per cubic foot of resin.

II 12.8 parts of 20–60 mesh resin prepared as in Part A
67.6 parts of dimethyl sulfate
65.3 parts of o-dichlorobenzene The resin is heated in a solution of the dimethyl sulfate in the o-dichlorbenzene for 4 hours at 115° C. The resulting resin, having a density of 12.9 pounds per cubic foot, has an anion exchange capacity of 7.9 kilograins as calcium carbonate per cubic foot of resin.

*Part C.—Evaluation for silica capacity*

A mixture of the two quaternarized resins prepared in Part B is evaulated for silica capacity and the determined capacity compared with a sample of an epichlorohydrin-polyamine resin prepared in accordance with the disclosure of U. S. Patent No. 2,469,683 dated May 10, 1949. The resin mixture is found to have a capacity of 4.4 kilograins as $SiO_2$ per cubic foot of resin whereas the epichlorohydrin-polyamine resin has a capacity of 3.9 kilograins as $SiO_2$ per cubic foot of resin. This difference of 0.5 kilograin is significant since the silica capacities of most anion resins are low and for some time resins of the epichlorohydrin-polyamine type have been the most satisfactory known for silica removal.

EXAMPLE 2

*Part A.—Preparation of copolymer*

51.5 parts (0.35 mol) of p-dimethylaminostyrene
22.8 parts (0.07 mol) of 40% divinylbenzene
1.2 parts of α,α'azoisobutyronitrile The above ingredients are charged into a suitable vessel which is evacuated and sealed. The contents of the sealed vessel are heated at 80° C. for 88 hours after which the soft, crepe-like resin produced is heated at 100° C. for 120 hours while exposed to the atmosphere. A hard, brittle, amber-colored resin is produced.

Part B.—Quaternarization of copolymer

I 12 parts of 20–40 mesh resin prepared as in Part A
67.6 parts of dimethyl sulfate A mixture of the resin and dimethyl sulfate is heated in a suitable vessel for 4 hours at 110° C. to 112° C. The resin, which is recovered by filtration and washed free of excess dimethyl sulfate with water, has an anion exchange capacity of 9.5 kilograins as calcium carbonate per cubic foot of resin and a density of 12.9 pounds per cubic foot.

II

The above quaternarization process is repeated except that 69.6 parts of allyl bromide are used in place of the dimethyl sulfate. The resin so-obtained has a capacity for anion exchange of 8.1 kilograins as calcium carbonate per cubic foot of resin and a density of 11.9 pounds per cubic foot.

EXAMPLE 3

Part A.—Preparation of copolymer 25.7 parts (0.18 mol) of p-dimethylaminostyrene
11.4 parts (0.035 mol) of 40% divinylbenzene
0.15 part of $a,a'$-azoisobutyronitrile The above ingredients are heated in a sealed vessel as described in Example 2, Part A, for 43 hours. The clear, light yellow, transparent, hard and slightly flexible resin obtained is then cured by heating at 100° C. for 48 hours while exposed to the atmosphere. A hard, brittle resin is obtained.

Part B.—Quaternarization of copolymer 12 parts of 20–40 mesh resin prepared as in Part A
67.6 parts of dimethyl sulfate A mixture of the resin and dimethyl sulfate is heated in a suitable vessel for 4 hours at 110°–112° C., and the resin is recovered and processed as described in Example 2, Part B. It has a density of 19.1 pounds per cubic foot and an anion exchange capacity of 10.4 kilograins as calcium carbonate per cubic foot of resin.

The p-dimethylaminostyrene, i. e., N,N'-dimethyl-p-aminostyrene, used in the examples may be readily prepared by catalytic thermal cracking of the corresponding 1,1-bis(dimethylaminophenyl) ethane and higher homologues thereof, such as tri(dimethylaminophenyl) diethane and the like, in accordance with the general process as described, for example, in the Sturrock and Lawe Patent No. 2,373,982 and in the Dixon and May Patent No. 2,450,334.

Other poly-N-substituted aminostyrenes containing no amino hydrogen atoms which may be used to prepare my new products include the tetramethyldiaminostyrenes, hexamethyltriaminostyrenes, and the like.

The present invention is in no sense limited to the use of divinylbenzene as one of the principal resin-forming ingredients, and other polymerizable organic materials containing at least two ethylenic double bonds and no aliphatic conjugated carbon-to-carbon double bonds may be substituted therefor. Some examples of such polyunsaturated materials are N,N'-methylene diacrylamide as well as other N,N'-alkylidene diacrylamides and N,N'-alkylidene dimethacrylamides which are described in the copending application of Lennart A. Lundberg, Serial No. 707,040 filed October 31, 1946, divinyl ether, divinyl sulfone, allyl ethers of polyhydric compounds such as glycerol, pentaerythritol, resorcinol, etc., divinyl ketone, divinyl sulfide, polyfumaramide, allyl acrylate, allyl methacrylate, and the like. Polyesters of allyl alcohol, 2-methallyl alcohol, 2-chlorallyl alcohol, etc., with polybasic acids, both organic and inorganic, may also be copolymerized with the p-dimethylaminostyrene according to the present invention. For example, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicone, diallyl silicate, triallyl tricarballylate, triallyl aconitate, triallyl citrate, triallyl phosphate, triallylcyanurate, and the corresponding substituted allyl esters are suitable.

It is essential that the material to be copolymerized with p-dimethylaminostyrene according to the process of the present invention be polyethylenically unsaturated, i. e., it must contain a plurality of ethylenic double bonds, preferably $CH_2=C<$ groups, and have no conjugated aliphatic carbon-to-carbon double bonds. Thus, while the material must have at least two double bonds it may have three, four, six, eighteen or any other number of such linkages.

The copolymerization reaction for the production of the intermediate resin which is quaternarized in the process of the present invention is preferably carried out in the presence of a polymerization catalyst. The usual peroxide type catalysts are, however, unsuitable because of the inhibitive presence of the amino group in the p-dimethylaminostyrene, and polymerization catalysts of the azo type such as, for example, the $a,a'$-azoisobutyronitrile or 2-azo-bis-isobutyronitrile of the examples, known as "Porophor N," 2 - azo - bis - 2 - methylbutyronitrile, 2 - azo-bis - 2 - methylheptonitrile, 1 - azo - bis - 1-cyclohexane - carbonitrile, dimethyl - 2 - azo-bis-isobutyrate, 4-azo-bis-4-cyanopentanoic acid, diazoamino aryl compounds such as diazo aminobenzene, the diazo aminotoluenes, and the like, as described in U. S. Patent No. 2,313,233, aromatic diazo compounds such as benzene diazonium chloride, benzene diazonium perchlorate, and the like as described in U. S. Patent No. 2,376,963, etc., are required.

Because of the sensitivity of the p-dimethylaminostyrene component of the polymerizable mixture the reaction should be carried out in the absence of air. This can be accomplished by effecting the reaction under an atmosphere of nitrogen, carbon dioxide or other inert gas or it may be carried out in a vacuum.

The concentration of catalyst employed is usually small and generally will range from about 0.05% to 2% based on the weight of copolymerizable mixture.

In general copolymerization temperatures will range from about 20°–25° C. up to the boiling point of the lower boiling of the two copolymerizable ingredients. The preferred temperature is about 80° C.

The p-dimethylaminostyrene and polyethylenically unsaturated material are generally combined in a molar ratio of from about 10:1 to about 1:1, respectively, although the invention is in no sense limited to these particular proportions. I prefer the use of a molar ratio of about 5:1.

The copolymerization reaction may be carried out in dispersion in a suitable polar organic medium, for example, dioxane, aliphatic glycol, diethylene glycol, 2-methyl, 2,4-pentanediol, propylene glycol, etc.; aliphatic ketones including dimethyl ketone, methyl ethyl ketone, etc. The copolymerization may also be carried out, if desired, in emulsion in an aqueous medium. In this case cationic, anionic, or non-ionic surface active agents may be added during the polymerization. Under these polymerization conditions fine or course beaded particles are formed which can be post quaternarized.

As noted from the above examples copolymers of p-dimethylaminostyrene and polyethylenically unsaturated materials such as divinyl-benzene must be cured in order to obtain a suitable hard, brittle resin. This may be done at from about room temperature (20°–25° C.) to about 150° C. I prefer to heat the copolymers at an elevated temperature, i. e., from about 90°–110° C.

Cured copolymers of p-dimethylaminostyrene and polyunsaturated material, particularly divinylbenzene, are quaternarized or alkylated by heating at elevated temperatures, i. e., about 60°–120° C., in the presence of a quaternarizing or alkylating agent either with or without an organic solvent. Suitable quaternarizing agents which may be used include, in addition to the dimethyl sulfate and allyl bromide of the examples, allyl chloride, ethylene chlorohydrin, epichlorohydrin, diethyl sulfate, ethylene oxide, benzyl chloride, ethylene dichloride, methyl chloride, ethyl chloride, trimethylene dibromide, glycerol dichlorohydrin, etc. I prefer to carry out the quaternarization reaction with no solvent present but if one is used, it should be an organic solvent inert to the particular alkylating agent used such as the o-dichlorbenzene of Example 1 and other halogenated aromatic hydrocarbons, the aromatic hydrocarbons themselves including benzene, toluene, the xylenes, etc., halogenated aliphatic hydrocarbons such as tetrachlorethane, dichlorethane, and the like, etc.

It is desirable to obtain as complete quaternarization as possible and a 1:1 molar ratio of p-dimethylaminostyrene to quaternarizing agent is, of course, the optimum theoretical proportion. Excess agent does neither harm nor particular good; a slight deficiency will merely result in decreased exchange capacity.

The anion active resins prepared in accordance with the present invention may be activated or regenerated by treatment with dilute alkaline solutions such as, for example, 0.1%–10% aqueous solutions of sodium hydroxide, sodium carbonate, ammonium hydroxide, etc.

The resinous materials produced in accordance with this invention are suitable for the removal of anions in general from liquid media. They may be used to extract strong mineral acids (preferably present in relatively low concentrations) as well as weaker inorganic acids such as silica, boric acid, hydrocyanic acid and the like, and organic acids such as acetic acid, oxalic acid, etc. from aqueous and other solutions. The anions of salts such as the chloride ion in ammonium chloride or the sulfate ion in ammonium sulfate may be removed by means of my new anion exchange products.

Thus, the anion active resins are useful for many purposes, examples of which are removal of acids from water and from alcoholic solutions, the purification of sugar solutions including cane and beet sugar solutions, molasses, grapefruit, pineapple and other fruit waste, and the purification of pectin, gelatin, formaldehyde solutions, etc., as catalysts for condensation reactions, hydrolytic cleavage of esters, and the like.

While my new resins are especially suitable for the removal of anions from aqueous media, they may be also used to extract acids or anions from other liquid media, and they may even be used for the extraction of acids from gases.

To be sufficiently insoluble for practical use in the water purification art, resins should have a sufficiently low solubility that they will not be dissolved by the solution being treated. Thus 1000 parts of water should not dissolve more than 1 part of the resin when water is passed through a bed of resin after the first cycle comprising an activation, exhaustion and reactivation of the resin.

While my invention is not in any sense limited thereto I prefer to use products of a particle size of from about 8 to about 60 mesh, screened dry on a U. S. standard screen. These may be ground to size, or they may be prepared in beaded form.

It is a particular advantage of the anion exchange resins of the present invention that they possess a good capacity for the removal of silica and other weak acids such as hydrocyanic acid from aqueous solutions.

I claim:

1. A process for the preparation of a granular, water-insoluble, anion exchange resin active for the removal of anions from solution which comprises copolymerizing N,N-dimethyl-p-aminostyrene with a polymerizable organic material containing at least two ethylenic double bonds and no aliphatic conjugated carbon-to-carbon double bonds in the presence of a polymerization catalyst which is an azo compound and in the absence of air, curing the copolymer obtained by heating, granulating the cured copolymer, and treating the granulated cured copolymer with an alkylating agent in an amount sufficient to effect quaternarization of the tertiary amino groups in said copolymer, the molar ratio of said N,N-dimethyl-p-aminostyrene to said polymerizable organic material in said copolymer being from about 10:1 to about 1:1.

2. A process for the preparation of a granular, water-insoluble, anion exchange resin active for the removal of anions from solution which comprises copolymerizing N,N-dimethyl-p-aminostyrene and divinylbenzene in a molar ratio of about 5:1 in the presence of a polymerization catalyst which is an azo compound in the absence of air, curing the copolymer so obtained by heating, granulating the cured copolymer, and quaternarizing the granulated cured copolymer by treatment with an alkylating agent.

3. A process as in claim 2 wherein the catalyst is $\alpha,\alpha'$-azoisobutyronitrile.

4. A process according to claim 2 in which the alkylating agent is dimethyl sulfate.

5. A process according to claim 2 in which the alkylating agent is allyl chloride.

EDWARD L. KROPA.

References Cited in the file of this patent

UNITED STATES PATENTS

| Number | Name | Date |
|---|---|---|
| 2,097,640 | Piggott | Nov. 2, 1937 |
| 2,366,008 | D'Alelio | Dec. 26, 1944 |
| 2,484,420 | Minsk | Oct. 11, 1949 |
| 2,559,529 | Bauman | July 3, 1951 |

OTHER REFERENCES

Strassburg et al., J. Am. Chem. Soc., 69, 2141–3 (1947).